(12) United States Patent
Herman et al.

(10) Patent No.: US 8,986,539 B2
(45) Date of Patent: Mar. 24, 2015

(54) INSIDE-OUT FLOW FILTER WITH PRESSURE RECOVERY

(75) Inventors: Peter K. Herman, Stoughton, WI (US); Bradley A. Smith, Columbus, IN (US); Benjamin L. Scheckel, Stoughton, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 407 days.

(21) Appl. No.: 13/345,863

(22) Filed: Jan. 9, 2012

(65) Prior Publication Data

US 2012/0267294 A1 Oct. 25, 2012

Related U.S. Application Data

(60) Provisional application No. 61/476,903, filed on Apr. 19, 2011.

(51) Int. Cl.
*B01D 29/085* (2006.01)
*B01D 29/23* (2006.01)
*B01D 29/90* (2006.01)
*B01D 35/147* (2006.01)
*B01D 35/30* (2006.01)
*B01D 29/00* (2006.01)

(52) U.S. Cl.
CPC ............ *B01D 29/232* (2013.01); *B01D 29/902* (2013.01); *B01D 35/147* (2013.01); *B01D 35/1475* (2013.01); *B01D 35/30* (2013.01); *B01D 2201/291* (2013.01); *B01D 2201/302* (2013.01); *Y10S 210/05* (2013.01)
USPC ........... 210/137; 210/456; 210/437; 210/438; 210/493.2; 210/DIG. 5; 210/446; 210/305; 210/306; 210/420; 210/457; 210/497.3; 55/521

(58) Field of Classification Search
CPC .. B01D 29/232; B01D 29/902; B01D 35/147; B01D 35/30; B01D 35/1475; B01D 2201/302; B01D 2201/291
USPC ............. 210/137, 456, 437–439, 450, 493.2, 210/DIG. 5, 446, 247, 304–306, 420, 428, 210/457, 497.01, 497.3, 441, 442, 451; 55/521
See application file for complete search history.

(56) References Cited

U.S. PATENT DOCUMENTS

| | | | |
|---|---|---|---|
| 3,229,817 A * | 1/1966 | Pall | .............................. 210/130 |
| 4,790,864 A | 12/1988 | Kostun | |
| 5,549,722 A | 8/1996 | Zemaitis et al. | |
| 5,750,024 A | 5/1998 | Spearman | |
| 6,309,436 B1 | 10/2001 | Holch | |
| 6,936,084 B2 * | 8/2005 | Schlensker et al. | ............. 55/321 |

(Continued)

FOREIGN PATENT DOCUMENTS

CN 101500680 8/2009

*Primary Examiner* — Nam Nguyen
*Assistant Examiner* — Madeline Gonzalez
(74) *Attorney, Agent, or Firm* — Foley & Lardner LLP

(57) ABSTRACT

In an inside-out flow filter, a transition pressure recovery member is provided at the inlet and has structured contoured guide surfaces guiding fluid flow therealong into the hollow interior of an annular filter element to minimize transition pressure loss from the inlet to the hollow interior. The transition pressure recovery member includes transition flow deceleration surfaces gradually decelerating flow of fluid into the hollow interior and minimizing pressure drop.

29 Claims, 4 Drawing Sheets

(56) References Cited

U.S. PATENT DOCUMENTS

| | | | |
|---|---|---|---|
| 7,182,804 B2 * | 2/2007 | Gieseke et al. ............ 95/287 |
| 7,614,390 B2 | 11/2009 | Holzmann et al. |
| 7,757,680 B2 | 7/2010 | Park |
| 7,799,109 B2 | 9/2010 | Dunsch et al. |
| 2008/0190832 A1 | 8/2008 | Schachtrup et al. |
| 2011/0113737 A1 | 5/2011 | Scheckel et al. |

* cited by examiner ial filter element having a hollow interior receiving fluid flowing axially thereinto through an inlet. The annular filter element includes filter media for filtering the fluid, and may be a coalescer element. The fluid flows from the hollow interior radially outwardly through the filter media to an outer surface of the filter element, and is discharged therefrom as clean filtered fluid.

INSIDE-OUT FLOW FILTER WITH PRESSURE RECOVERY

CROSS-REFERENCE TO RELATED APPLICATION

This application claims the benefit of and priority from Provisional U.S. patent Application No. 61/476,903, filed Apr. 19, 2011, incorporated herein by reference.

BACKGROUND AND SUMMARY

The invention relates to inside-out flow filters.

Inside-out flow filters are known, and typically include an annular filter element having a hollow interior receiving fluid flowing axially thereinto through an inlet. The annular filter element includes filter media for filtering the fluid, and may be a coalescer element. The fluid flows from the hollow interior radially outwardly through the filter media to an outer surface of the filter element, and is discharged therefrom as clean filtered fluid.

The present disclosure arose during continuing development efforts in the above technology.

DETAILED DESCRIPTION

Figure 1:
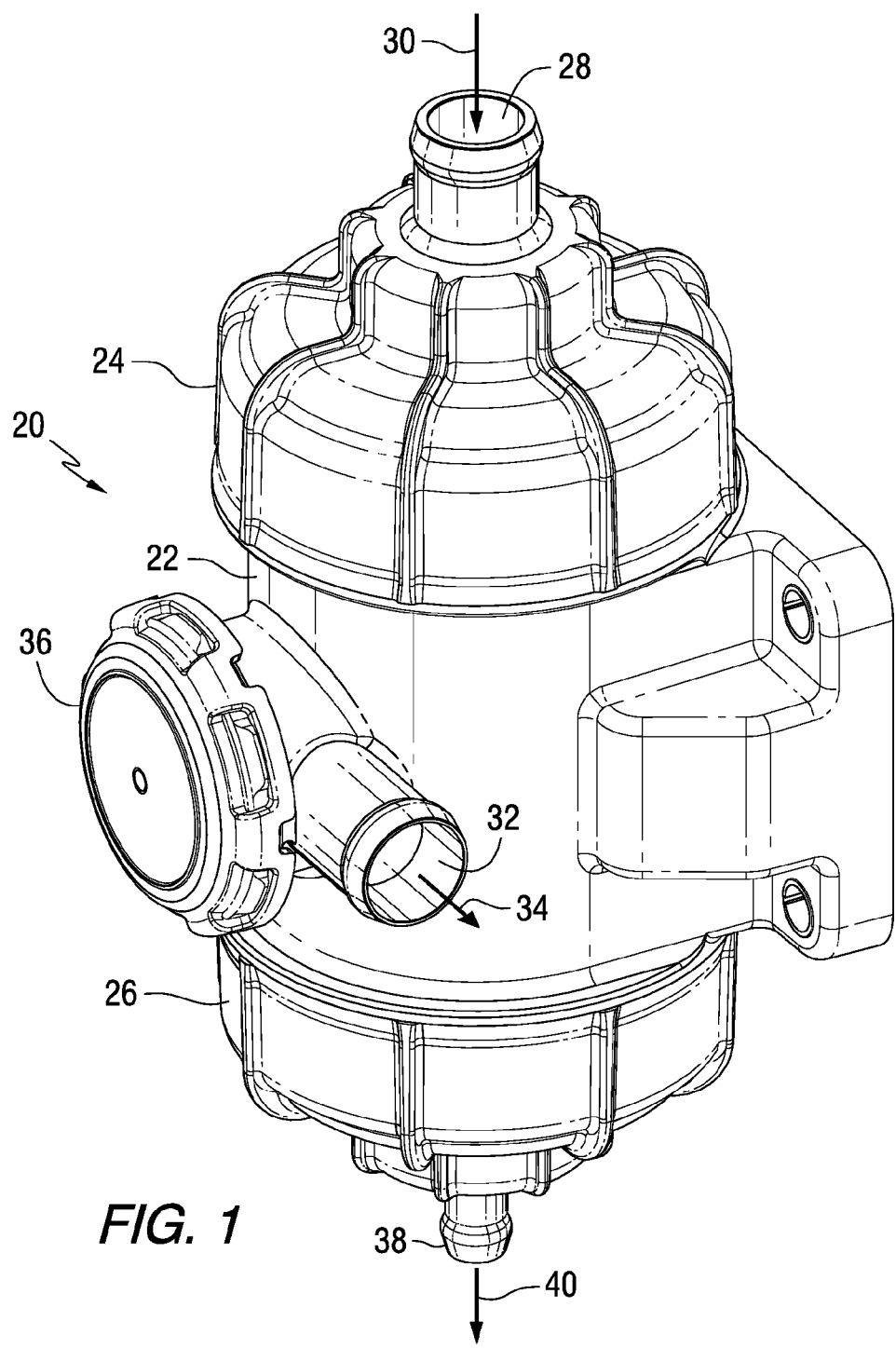
FIG. 1 is a perspective view showing an inside-out flow filter.

FIG. 1 shows an inside-out flow filter 20 including a housing 22 closed by upper and lower lids or ends 24 and 26. Upper lid 24 has an inlet 28 receiving fluid flow thereinto as shown at arrow 30. Central housing 22 has an outlet 32 for discharging clean filtered fluid such as air as shown at arrow 34, which discharge may be controlled by a CDR (Crankcase Depression Regulator) valve 36, as is known, in the case of an automotive application. Lower lid 26 has a drain outlet 38 for draining separated collected liquid as shown at arrow 40. The assembly described thus far is known in the prior art.

Figure 2:
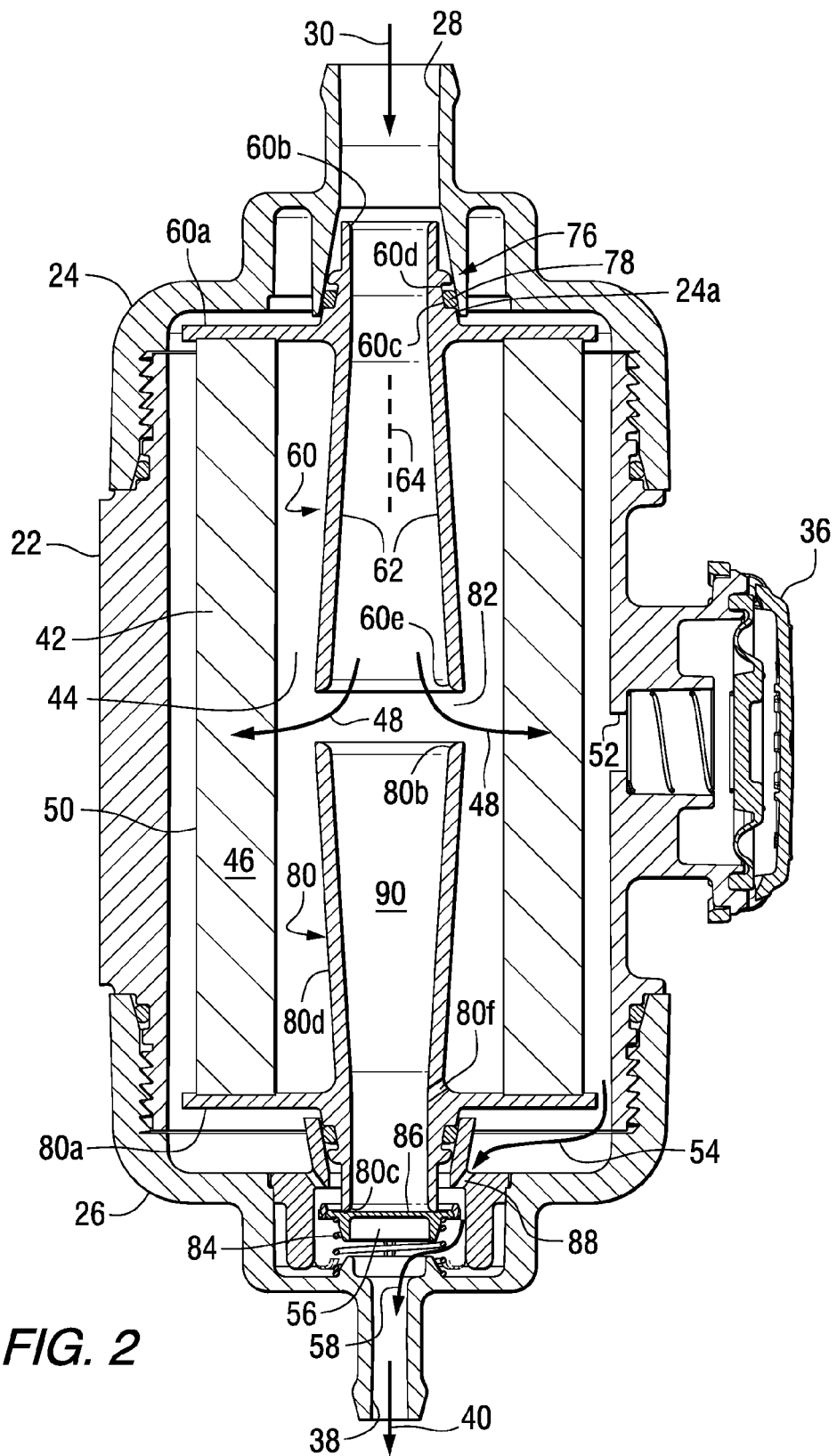
FIG. 2 is a sectional view of the filter of FIG. 1 and illustrating the present disclosure.

The filter includes an annular filter element 42, FIG. 2, having a hollow interior 44 receiving fluid flowing axially thereinto as shown at arrow 30 through inlet 28. The annular filter element includes filter media 46 for filtering fluid. The fluid flows from hollow interior 44 radially outwardly through the filter media as shown at arrows 48 to outer surface 50 of filter element 42, and then is discharged through exit port 52 and CDR valve 36 to outlet 32, as is known. Liquid contained in the filtered fluid may be coalesced by media 46, which coalesced separated liquid may drain as shown at arrow 54 through a poppet drain valve 56 as shown at arrow 58 for discharge at outlet 38 as shown at arrow 40. For further reference regarding poppet valve 56, applicant notes commonly owned co-pending U.S. patent application Ser. No. 12/947,195, filed Nov. 16, 2010, published May 19, 2011, U.S. 2011/0113737, incorporated herein by reference.

Figure 3:
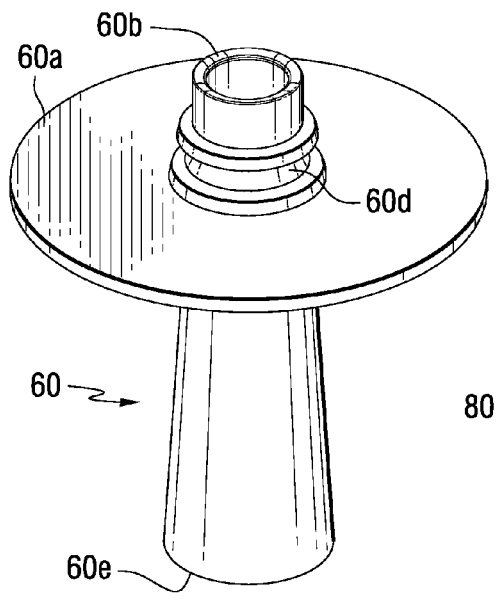
FIG. 3 is a perspective view of a component of FIG. 2.
Figure 4:
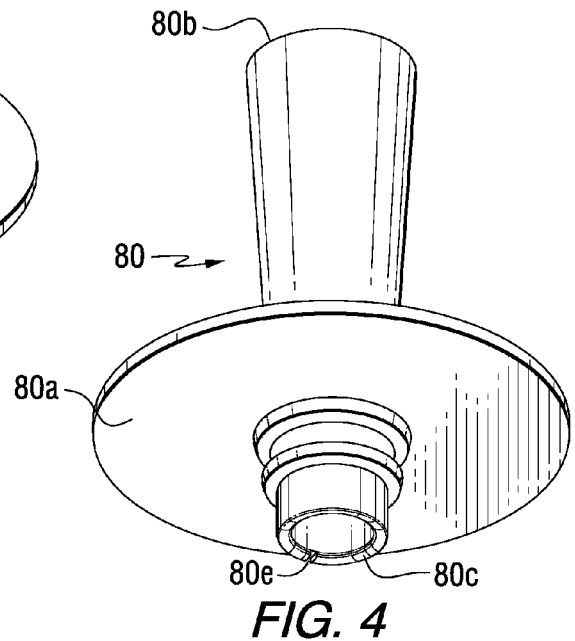
FIG. 4 is a perspective view of another component of FIG. 2.

In the present disclosure, a transition pressure recovery member 60, FIGS. 2, 3, is provided at inlet 28 and has structured contoured guide surfaces 62 guiding fluid flow therealong into hollow interior 44 to minimize transition pressure loss from inlet 28 to hollow interior 44. The structured contoured guide surfaces include transition flow deceleration surfaces gradually decelerating flow of fluid into the hollow interior and minimizing pressure drop. Transition pressure recovery member 60 extends axially as shown at axis 64 into hollow interior 44. Structured contoured guide surfaces 62 define a flow path which tapers to increasing cross-sectional areas as transition pressure recovery member 60 extends axially into the hollow interior, wherein the rate of change of the increasing cross-sectional areas is selected to avoid abrupt sudden expansion pressure drop. In one embodiment, the taper is selected to have an included angle in the range 3° to 10°. In another embodiment, the taper is selected to provide a K factor in the range 0.1 to 0.3 and associated pressure recovery of 70% to 90%. In one embodiment, a conical diffuser 60 is used for the transition pressure recovery member and is integrated with a filter endcap as shown at 60a, such that the conical diffuser aligns with inlet 28 of the filter housing when assembled, thus allowing a high velocity jet to enter the diffuser, with minimal disruption. The diffuser projects inwardly into the filter central core at hollow interior 44, and has a rather substantial axial length to desirably provide a shallow angle for efficiently converting velocity energy back into static pressure, per Bernoulli's law. As noted, the included cone angle in one embodiment ranges from 3° to 10°, given the lowest possible K factor, but may still provide some value up to cone angles approaching 20° and perhaps 30°, though this would diminish performance. The K factor is a measure of how much of the velocity energy is lost, i.e. converted to heat instead of recovered as static pressure, when the flow expands from a small inlet to a larger outlet, as is known. A K factor value of zero would be ideal, but values of 0.1 to 0.3 are more realistic, i.e. 10% to 30% of the velocity energy is lost, or conversely 70% to 90% is recovered. An abrupt full expansion results in substantial or complete loss of such energy. As noted in *Fluid Mechanics*, F. White, Fourth Edition, MacGraw-Hill, 1999, page 371, showing and discussing K factor, cone angles in the range 40° to 140° can actually be worse than a fully abrupt 180° expansion due to eddy stall and larger skin friction.

Figures 7, 8:
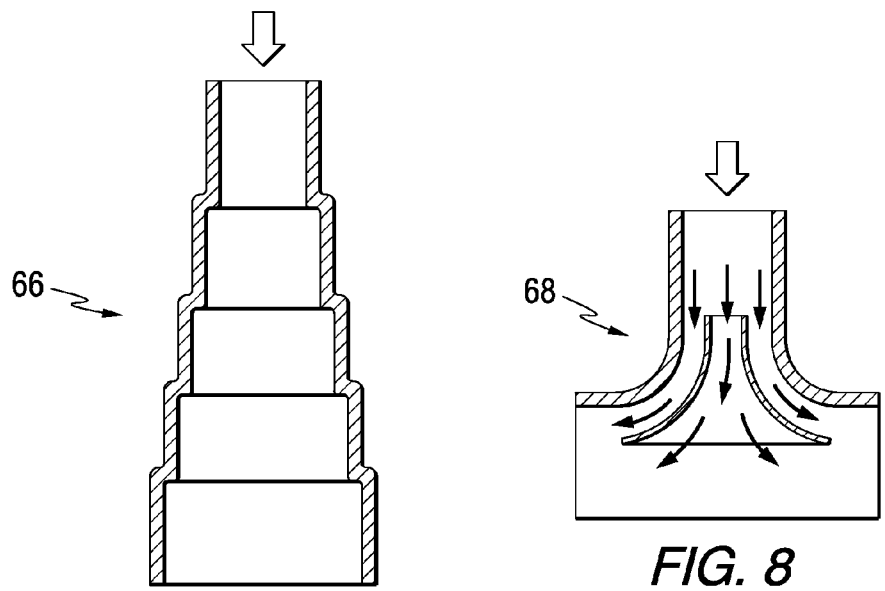
FIG. 7 is a sectional view showing an alternate embodiment of a component of FIG. 2.
FIG. 8 is like FIG. 7 and shows another embodiment.
Figures 9, 10, 11:
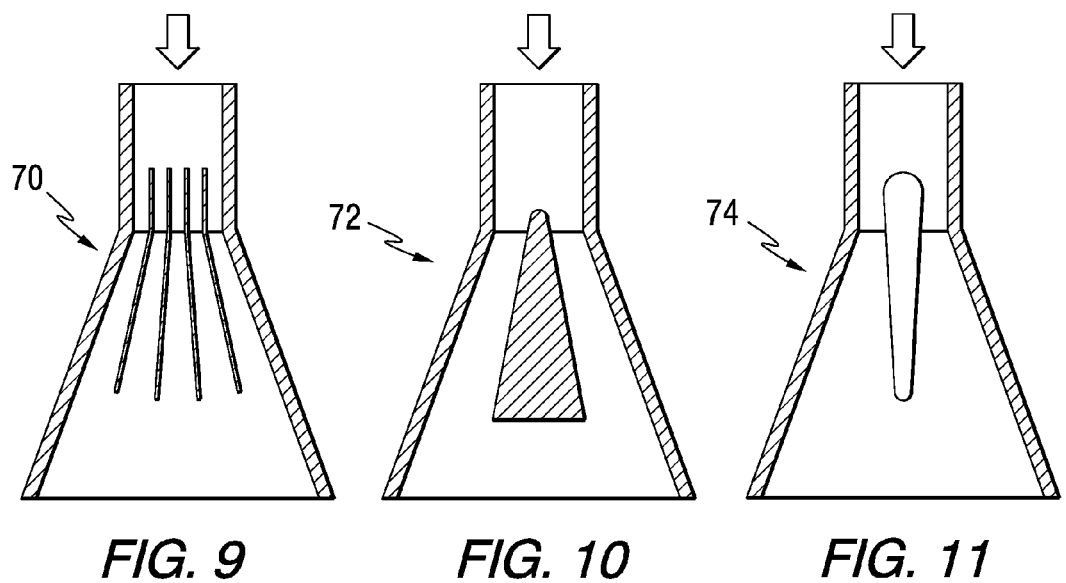
FIG. 9 is like FIG. 7 and shows another embodiment.
FIG. 10 is like FIG. 7 and shows another embodiment.
FIG. 11 is like FIG. 7 and shows another embodiment.

In FIG. 2, the noted taper of the structured contoured guide surfaces 62 of the transition pressure recovery member are rectilinear. In further embodiments, the transition pressure recovery member is selected from a group including conical, FIG. 2, stepped as shown at 66 in FIG. 7, radial-annular diffuser as shown at 68 in FIG. 8, inner fairing as shown at 70 in FIG. 9, and internal guide vane as shown at 72 in FIG. 10 and alternately at 74 in FIG. 11.

Filter element 42 has an endcap 60a at inlet 28. As noted, in one embodiment the endcap 60a and the transition pressure recovery member 60 are a single integral component, FIG. 3. A seal 76, FIG. 2, interfaces between and engages transition pressure recovery member 60 and closure lid 24 in sealing relation. Transition pressure recovery member 60 has a smoothly rounded entrance 60b receiving fluid flow from inlet 28 and minimizing entrance contraction losses in transfer from the inlet to the transition pressure recovery member. In one embodiment, transition pressure recovery member 60 engages the housing at closure lid 24 in sealing relation along a beveled engagement surface at 76. Transition pressure recovery member 60 has a first beveled surface 60c. The housing at closure lid 24 has a second beveled surface 24a. The first and second beveled surfaces mate along a complemental taper. A sealing gasket, e.g. as provided by an O-ring 78, is sealingly engaged between the first and second beveled surfaces. Transition pressure recovery member 60 has an annular gasket seat 60d, FIG. 3, along the noted first beveled surface and capturing sealing gasket 78 and facing the noted second beveled surface 24a.

In a further embodiment, filter element 42 has first and second identical members 60 and 80 with respective first and second endcaps 60a and 80a at distally opposite respective first and second axial ends (upper and lower ends in FIG. 2) of the filter element. First member 60 is the noted transition pressure recovery member. Second member 80 is identical to member 60 but is in inverted relation thereto, such that members 60 and 80 face each other in mirror image relation in hollow interior 44. The provision of identical members 60 and 80, including endcaps 60a and 80a, is desirable for manufacturing and inventory efficiency, reducing the number of different parts which must be stocked. In this embodiment, first and second members 60 and 80 are identical, with respective endcaps 60a and 80a at distally opposite respective first and second axial ends of filter element 42. First member 60 is the noted transition pressure recovery member. First and second members 60 and 80 face each other in mirror image relation in hollow interior 44. First and second members 60 and 80 extend into hollow interior 44 and have respective inner ends 60e and 80b axially spaced from each other by an axial gap 82 therebetween. The axial gap 82 should be sized so that the velocity leaving the diffuser provided by member 60 is not re-accelerated. Accordingly, the area of cylindrical gap 82 should be greater than or equal to the discharge area of the diffuser. Gap 82 should be sized so that its axial height is greater than or equal to the diffuser outlet diameter divided by four.

Figure 5:
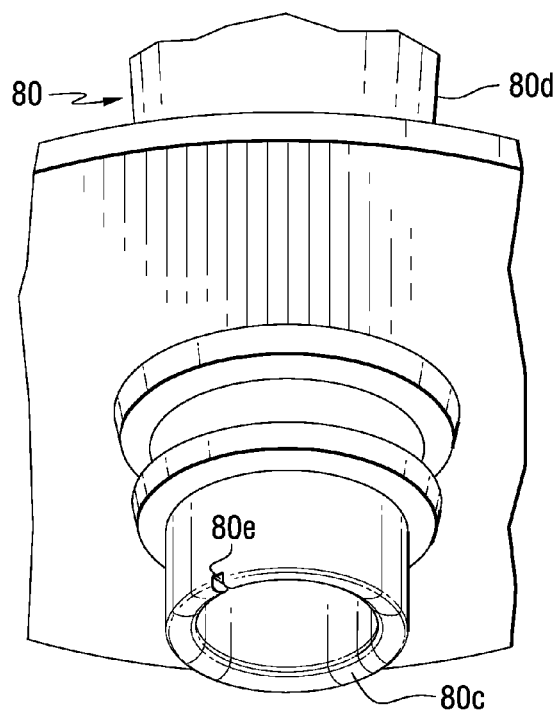
FIG. 5 is an enlarged view of a portion of the component of FIG. 4.
Figure 6:
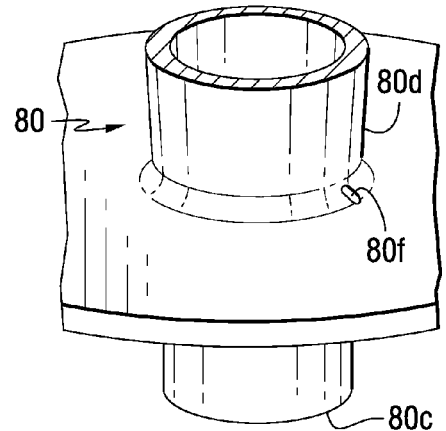
FIG. 6 is an enlarged view of another portion of the component of FIG. 4.

As noted, filter element 42 has first and second members 60 and 80 with respective first and second endcaps 60a and 80a at distally opposite respective first and second axial ends (upper and lower ends in FIG. 2) of filter element 42. First member 60 is the noted transition pressure recovery member. Second member 80 has the noted normally closed pressure-relief poppet bypass valve 56 which opens in response to a predetermined pressure in hollow interior 44 overcoming the bias of compression spring 84, whereupon disc 86 moves downwardly in FIG. 2 away from the valve seat provided by the lower end 80c of member 80, to allow fluid to flow radially outwardly through the gap therebetween, and then downwardly as shown at arrow 58 in the case of liquid, or upwardly through passage 88 in the case of air or gas for flow to exit 52 and outlet 32. Filter element 42 may be a coalescer element, and the noted second member 80 at second endcap 80a is at the lower end of the coalescer element and has an upper extension at 80d extending upwardly into hollow interior 44 and defining a reservoir 90 which collects liquid in the fluid prior to separation by coalescer element 42. Second member 80 has the noted valve seat 80c engaged by poppet bypass valve 56 at disc 86. Second member 80 has one or more through-notches 80e, FIG. 5, in valve seat 80c discharging collected liquid from reservoir 90 in upper extension 80d of second member 80 even when poppet bypass valve 56 is closed. One or more weep-holes 80f, FIGS. 6, 2, are provided in upper extension 80d of second member 80 and discharges collected liquid from reservoir 90 in second member upper extension 80d into hollow interior 44, to keep reservoir 90 from getting too full. One or more weep-holes 80f may be provided in addition to or in place of one or more through-notches 80e.

The present disclosure recovers otherwise lost energy, and reduces flow restriction. By recovering dynamic pressure, flow restriction is reduced. The noted diffuser enables use of an inlet which may otherwise be too small and would cause excessive pressure drop in a filter without such diffuser. The disclosure is particularly useful in air-oil coalescing applications, though it may also be beneficially used for liquid-liquid coalescers, including fuel-water separators that utilize radially outward flow. In the latter, velocities and dynamic pressure may be lower, and the benefit of pressure recovery may be less significant relative to total allowed restriction.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation. As used herein, the term annular in referring to annular filter element includes various shapes including circular or cylindrical, oval, racetrack shape, oblong, pear shape, triangular, rectangular, and other closed-loop shapes.

What is claimed is:

1. An inside-out flow filter comprising:
   an annular filter element having a hollow interior receiving fluid flowing axially thereinto through an inlet, said annular filter element comprising:
   filter media for filtering said fluid, said fluid flowing from said hollow Interior radially outwardly through filter media to an outer surface of said filter element, and
   transition pressure recovery member at said inlet and having structured contoured guide surfaces guiding fluid flow therealong into said hollow interior to minimize transition pressure loss from said inlet to said hollow interior, wherein said transition pressure recovery member extends into said hollow interior, and wherein said structured contoured guide surfaces of said transition pressure recovery member define a flow path which tapers to increasing cross-sectional areas as said transition pressure recovery member extends into said hollow interior.

2. The inside-out flow filter according to claim 1 wherein said structured contoured guide surfaces of said transition pressure recovery member comprise transition flow deceleration surfaces gradually decelerating flow of fluid into said hollow interior and minimizing pressure drop.

3. The inside-out flow filter according to claim 2 wherein the rate of change of said increasing cross-sectional areas is selected to avoid abrupt sudden expansion pressure drop.

4. The inside-out flow filter according to claim 3 wherein said taper is selected to have an included angle up to 30°.

5. The inside-out flow filter according to claim 3 wherein said taper is selected to have an included angle up to 20°.

6. The inside-out flow filter according to claim 3 wherein said taper is selected to have an included angle up to 10°.

7. The inside-out flow filter according to claim 3 wherein said taper is selected to have an included angle in the range 3° to 10°.

8. The inside-out flow filter according to claim 3 wherein said taper is selected to provide a K factor in the range 0.1 to 0.3 and associated pressure recovery of 70% to 90%.

9. The inside-out flow filter according to claim 3 wherein said taper is rectilinear.

10. The inside-out flow filter according to claim 3 wherein said transition Pressure recovery member is selected from a group including conical, stepped, radial-annular diffuser, inner fairing, and internal guide vane.

11. The inside-out flow filter according to claim 3 wherein said transition Pressure recovery member is a conical diffuser.

12. The inside-out flow filter according to claim 1 wherein said filter element has an endcap at said inlet, and said endcap and said transition pressure recovery member are a single integral component.

13. The inside-out flow filter according to claim 12 wherein said filter comprises a housing containing said filter element and having a closure lid at said inlet, and a seal interfacing between and engaging said transition pressure recovery member and said closure lid in sealing relation.

14. The inside-out flow filter according to claim 1 wherein said filter comprises a housing containing said filter element and having a closure lid having said inlet supplying fluid flow to said transition pressure recovery member, said transition pressure recovery member having a smoothly rounded entrance receiving fluid flow from said inlet and minimizing entrance contraction losses in transfer from said inlet to said transition pressure recovery member.

15. The inside-out flow filter according to claim 1 wherein said filter comprises a housing containing said filter element, and wherein said transition pressure recovery member is in said housing.

16. The inside-out flow filter according to claim 1 wherein said filter comprises a housing containing said filter element, wherein said transition pressure recovery member engages said housing in sealing relation along a beveled sealing engagement surface.

17. The inside-out flow filter according to claim 16 wherein said transition pressure recovery member has a first beveled surface, said housing has a second beveled surface, wherein said first and second beveled surfaces mate along a complemental taper.

18. The inside-out flow filter according to claim 17 comprising a sealing Gasket sealingly engaged between said first and second beveled surfaces.

19. The inside-out flow filter according to claim 18 wherein said transition pressure recovery member has an annular gasket seat along said first beveled surface and capturing said sealing gasket and facing said second beveled surface.

20. The inside-out flow filter according to claim 16 wherein said housing has a closure lid engaging said transition pressure recovery member and having said inlet supplying fluid flow to said transition pressure recovery member, wherein said beveled sealing engagement surface is at the engagement of said closure lid and said transition pressure recovery member.

21. The inside-out flow filter according to claim 1 wherein said filter element has first and second identical members with respective first and second endcaps at distally opposite respective first and second axial ends of filter element, wherein said first member is said transition pressure recovery member.

22. The inside-out flow filter according to claim 21 wherein said first and second members face each other in mirror image relation in said hollow interior.

23. The inside-out flow filter according to claim 22 wherein said first and second members extend into said hollow interior and have inner ends axially spaced from each other by an axial gap therebetween.

24. The inside-out flow filter according to claim 23 wherein said transition pressure recovery member is a diffuser having a diffuser outlet diameter at said axial gap, and wherein said axial gap has an axial height greater than or equal to said diffuser outlet diameter divided by four.

25. The inside-out flow filter according to claim 1 wherein said filter element has first and second members with respective first and second endcaps at distally opposite respective first and second axial ends of said filter element, said first member is said transition pressure recovery member, said second member has a normally closed pressure-relief poppet bypass valve which opens in response to a predetermined pressure in said hollow interior.

26. The inside-out flow filter according to claim 25 wherein said filter element is a coalescer element, said second member at said second end cap is at a lower end of said coalescer element and has an upper extension extending upwardly into said hollow interior and defining a reservoir which collects liquid in said fluid prior to separation by said coalescer element, said second member has a valve seat engaged by said poppet bypass valve, and comprising one or more through-notches in said valve seat discharging collected liquid from said reservoir in said second member upper extension even when said poppet bypass valve is closed.

27. The inside-out flow filter according to claim 1 wherein said filter element has first and second members with respective first and second endcaps at distally opposite respective first and second axial ends of said filter element, said filter element is a coalescer element, said second member at said second endcap is at a lower end of said coalescer element and has an upper extension extending upwardly into said hollow interior and defining a reservoir, and comprising one or more weep-holes in said upper extension of said second member and discharging collected liquid from said reservoir in said second member upper extension into said hollow interior.

28. The inside-out flow filter according to claim 1 wherein said filter element has first and second members with respective first and second endcaps at distally opposite respective first and second axial ends of said filter element, said first member is said transition pressure recovery member, said filter element is a coalescer element, said second member at said second endcap is at a lower end of said coalescer element and has an upper extension extending upwardly into said hollow interior and defining a reservoir which collects liquid in said fluid prior to separation by said coalescer element.

29. An inside-out flow filter comprising:
  an annular filter element having a hollow interior receiving fluid flowing axially thereinto through an inlet, said annular filter element comprising:
    filter media for filtering said fluid, said fluid flowing from said hollow interior radially outwardly through filter media to an outer surface of said filter element, and
    a transition pressure recovery member at said inlet and having structured contoured guide surfaces guiding fluid flow therealong into said hollow interior to minimize transition pressure loss from said inlet to said hollow interior;
  wherein said filter element has first and second members with respective first and second endcaps at distally opposite respective first and second axial ends of said filter element, said first member is said transition pressure recovery member, said second member has a normally closed pressure-relief poppet bypass valve which opens in response to a predetermined pressure in said hollow interior; and wherein said filter element is a coalescer element, said second member at said second end cap is at a lower end of said coalescer element and has an upper extension extending upwardly into said hollow interior and defining a reservoir which collects liquid in said fluid prior to separation by said coalescer element, said second member has a valve seat engaged by said poppet bypass valve, and comprising one or more through-notches in said valve seat discharging collected liquid from said reservoir in said second member upper extension even when said poppet bypass valve is closed.

* * * * *